United States Patent [19]

Iwasaki

[11] 4,361,045
[45] Nov. 30, 1982

[54] VIBRATION SENSOR

[75] Inventor: Shinichiro Iwasaki, Auburn Heights, Mich.

[73] Assignee: Aisin Seiki Company, Limited, Kariya, Japan

[21] Appl. No.: 182,847

[22] Filed: Aug. 29, 1980

[51] Int. Cl.³ .............................................. G01H 1/00
[52] U.S. Cl. ....................................... 73/654; 336/30
[58] Field of Search ................. 73/517 R, 517 B, 654, 73/658; 324/2.7, 208; 336/110, 30

[56] References Cited

U.S. PATENT DOCUMENTS

| | | | |
|---|---|---|---|
| 2,697,594 | 12/1954 | Stanton | 73/517 B |
| 2,767,973 | 10/1956 | ter Veen et al. | 73/654 X |
| 2,860,313 | 11/1958 | Israel | 336/110 |
| 2,882,392 | 4/1959 | Sands | 336/110 X |
| 2,913,688 | 11/1959 | Slebodnik et al. | 336/134 |
| 3,104,552 | 9/1963 | Bouchard | 73/516 R |
| 3,128,625 | 4/1964 | Heineman | 73/861.56 |
| 3,168,830 | 2/1965 | Chass | 73/517 R X |
| 3,281,743 | 10/1966 | Anderson | 336/30 |
| 3,855,528 | 12/1974 | Brown | 324/117 R |
| 3,877,314 | 4/1975 | Bernin | 73/517 R |
| 4,140,971 | 2/1979 | Blincoe | 324/208 |

FOREIGN PATENT DOCUMENTS 909023 10/1962 United Kingdom .

OTHER PUBLICATIONS

"Force and Displacement Transducers" by Mohri et al., from "Electrical Engineering in Japan", vol. 99, No. 2, pp. 105-112, 2-79.

Primary Examiner—James J. Gill
Attorney, Agent, or Firm—Oblon, Fisher, Spivak, McClelland & Maier

[57] ABSTRACT

A vibration sensor comprised of a movable body, a permanent magnet coupled to the movable body, and a displacement pulse phase conversion unit including a magnetically soft member carrying an electrical coil thereon and fixedly disposed in the vicinity of the course of movement of the permanent magnet. A pulse voltage is applied to one end of the electrical coil. A voltage drop occurs across a resistor which is connected in series with the other end of the electrical coil. A time lag of the voltage drop with respect to the pulse voltage, representing a vibrational amplitude, is provided in the form of an analog voltage.

3 Claims, 20 Drawing Figures

VIBRATION SENSOR

BACKGROUND OF THE INVENTION

1. Field of the Invention

This invention relates to a vibration sensor which translates vibration into an electrical signal, and more particularly to a vibration sensor of the type including a movable body which is subjected to a vibration and in which displacement of the movable body is converted into an electrical signal.

2. Description of the Prior Art

A conventional arrangement is known in which a strain gauge of a semiconductor converts change in resistance, corresponding to the amplitude of vibration, into a vibration detection signal. In this type of sensor arrangement, the change in resistance, corresponding to the vibrational amplitude, is so low that circuitry connected to the sensor would be complicated due to the reduction of noises. The range of temperature within which the sensor may function is restricted to a range from approximately $-30°$ C. to $+100°$ C. since the semiconductor is highly influenced by thermal drift.

SUMMARY OF THE INVENTION

It is therefore a primary object of the present invention to provide a vibration sensor which only requires relatively simple processing of a vibration detection signal.

It is another object of the invention to provide a vibration sensor having high mechanical strength, high resilience and an improved durability which is not readily influenced by changes in temperature.

In accordance with the present invention, a permanent magnet is fixedly mounted upon a movable body. A magnetically soft member having a transverse cross-section of a reduced magnitude so that magnetic saturation is easily achieved is provided. An electrical coil having an increased number of turns is provided so that the magnetically soft member can be magnetically saturated with a relatively low applied voltage or at a relatively low current level. The permanent magnet is small and the magnetically soft member is exposed to a magnetic field having a magnetic strength corresponding to the movement of the magnet.

A time T required for the magnetically soft member to saturate (from the instant of application of a voltage to an electrical coil disposed on the member) can be expressed approximately as follows:

$$T = (N/E)(\phi_m - \phi_x) \qquad (1)$$

where E represents the voltage applied, N the number of turns in the electrical coil, $\phi_m$ the maximum flux which is approximately equivalent to the saturation flux and $\phi_x$ a flux defined by an external magnetic field. As the magnitude of $\phi_x$, which is applied to the magnetically soft member, changes in response to movement of the permanent magnet, the value of T also changes. In this manner, as the permanent magnet is displaced in response to a vibration to cause a change in the external flux $\phi_x$ applied to the magnetically soft member, the length of time T, from the application of a voltage to the electrical coil until the coil current reaches a given level, changes. Accordingly, in the vibration sensor of this invention, an electrical circuit or a semiconductor electronic device is provided which determines the value of T and provides an electrical signal in the form of a voltage level or a digital code indicative of such value.

In a preferred embodiment of the invention, an amorphous magnetic material is used to form the magnetically soft member. Since an amorphous magnetic member must be manufactured by quenching from a liquid phase metal, it is formed of a thin sheet. It exhibits ferromagnetism and has a high level of magnetic saturation, high permeability, and a low level of coercive force while exhibiting a very high break strength and excellent resiliency and stability. Such properties of an amorphous material are very useful in the vibration sensor of this invention. Its use advantageously facilitates signal processing and increases the accuracy in the determination of the value T. In addition, considering the mechanical aspects, the manufacturing process is simplified while improving the resistance to vibrations or shocks.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference characters designate like or corresponding parts throughout the several view, and wherein:

FIG. 2b graphically illustrates the waveforms of input and output signals to or from the processing circuit shown in FIG. 2a;

FIG. 3d graphically illustrates data for a 30 mm long permanent magnet, corresponding to that shown in FIG. 3b, when a pulse voltage is applied to the electrical coil with a polarity such that an N-pole is produced at the upper end of the magnetically soft member as viewed in FIG. 3a;

FIG. 5a graphically illustrates voltage data indicative of the time lag which varies in accordance with the travel x of a 10 mm long permanent magnet in the X—X direction utilizing the arrangement shown in FIG. 3a with the electrical coil connected to the electrical processing circuit shown FIG. 2a, a pulse voltage being applied to the electrical coil with a polarity such that an S-pole is produced at the upper end of the magnetically soft member, as viewed in FIG. 3a;

FIG. 5b graphically illustrates data corresponding to FIG. 5a when a pulse voltage is applied to the electrical coil with such polarity that an N-pole is produced at the upper end of the magnetically soft member, as viewed in FIG. 3a;

FIG. 10b graphically illustrates voltage data indicative of a time lag which varies in accordance with the travel x of a 30 mm long permanent magnet in the X—X direction, utilizing the arrangement shown in FIG. 10a and a pair of electrical coils spaced apart by 35 mm and connected to the electrical processing circuit shown in FIG. 10, a pulse voltage being applied to the electrical coils with a polarity such that an S-pole is produced at the upper end of the respective magnetically soft members, as viewed in FIG. 10a;

FIG. 10c graphically illustrates data corresponding to FIG. 10b when a pulse voltage is applied to the electrical coils with a polarity such that an N-pole is produced at the upper end of the respective magnetically soft members, as viewed in FIG. 10a;

DETAILED DESCRIPTION OF THE PREFERRED EMBODIMENTS

Figure 1:
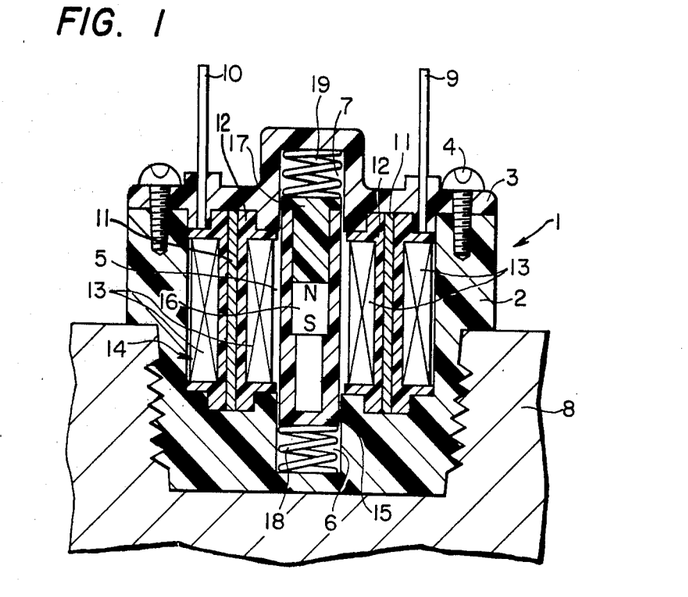
FIG. 1 is a longitudinal sectional view of the vibration sensor according to one embodiment of the invention.

In the embodiment shown in FIG. 1, a vibration sensor 1 includes a hollow body 2 formed of a resin material upon which a resin covering 3 is fixedly secured by screws 4. In the body 2 there are defined a large space 5 and two small spaces 6 an 7 which are in communication with the space 5. In detail, the resin body 2 is adapted to be mounted on a cylinder block 8 of a vehicle engine. The resin covering 3 is provided with two terminals 9 and 10. A pair of magnetically soft members 11, a pair of bobbins 12 surrounding the entire outer periphery of the magnetically soft member 11 and a pair of electrical coils 13, which are disposed on the bobbins 12, are provided at the periphery of the large space 5 defined by the hollow resin body 2 and a resin cover 3 so that they form an assembly 14.

A hollow holder 15 for the permanent magnet 16 extends in an axial direction at the center of the large space 5. The permanent magnet holder 15 is guided in such a manner that one end of the holder 15 is normally disposed within the space 6 defined in the body 2 and the other end of the holder is normally disposed within the space 7 defined in the resin covering 3. The permanent magnet 16 is held within the holder by pressing a cap 17 thereinto. Compression springs 18 and 19 are disposed in the small spaces 6 and 7, respectively, to support a movable body including the magnet holder 15, the permanent magnet 16 and the cap 17 so that the movable body can move in an axial direction in response to the vibration.

A displaced position of the permanent magnet 16 is detected by an electrical processing circuit.

A magnetically soft material exhibiting high permeability ($\mu_{max} > 10^3$) and low coercive force ($< 1.0$ Oe) is used in this invention. Some magnetically soft materials are described in Hasegawa et al., "Soft Magnetic Properties of Metallic Glasses—Recent Development", J. Appl. Phys. 50(3), March, 1979, pp. 1551–1556. Magnetically soft materials are sold under the trademark METGLAS (TM) by Allied Chemical Corp.

Figure 2A:
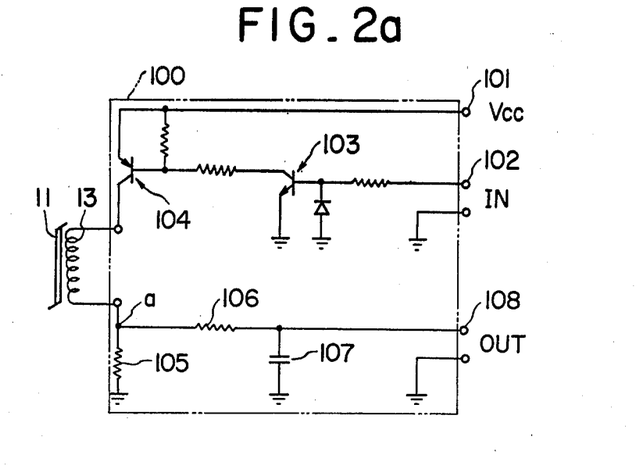
FIG. 2a is a circuit diagram of an electrical processing circuit connected to the vibration sensor shown in FIG. 1 for producing an analog voltage of a level corresponding to the vibrational amplitude.

FIG. 2a shows one form of electrical processing circuit 100. The circuit 100 includes a terminal 101 adapted to be connected with a given d.c. voltage, on the order of +5 V, for example. The circuit also includes an input terminal 102, to which a voltage pulse having a frequency on the order of 5–25 kHz, for example, is applied. NPN transistor 103 which has its base connected to the terminal 102 is rendered conductive during the time the pulse voltage remains positive, and is rendered non-conductive when the pulse voltage assumes a ground level. A PNP transistor 104 is turned on and off when the transistor 103 is turned on and off, respectively. Hence, the supply voltage (Vcc) is applied to the electrical coil 13 during the time the voltage pulse applied to the input terminal 102 remains positive, while no voltage is applied thereto during the time the pulse voltage remains at the ground level.

A voltage proportional to a current flow through the coil 13 is developed across a resistor 105, and is integrated by an integrator formed by a resistor 106 and a capacitor 107, with the integrated voltage appearing at an output terminal 108.

Figure 2B:
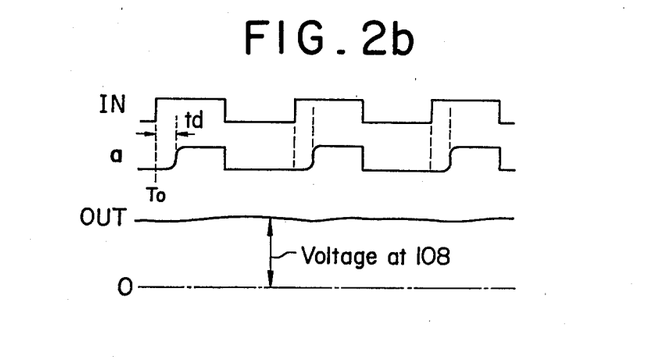

FIG. 2b graphically illustrates the waveform of the input and the output voltage of the circuit shown in FIG. 2a. The time lag td from the rising end of the input voltage (IN) until the voltage across the resistor 105 exceeds a given level, as well as the integrated voltage Vx, which represents an integral of the voltage across the resistor 105, both depend on the location of the permanent magnet 16.

Figure 3A:
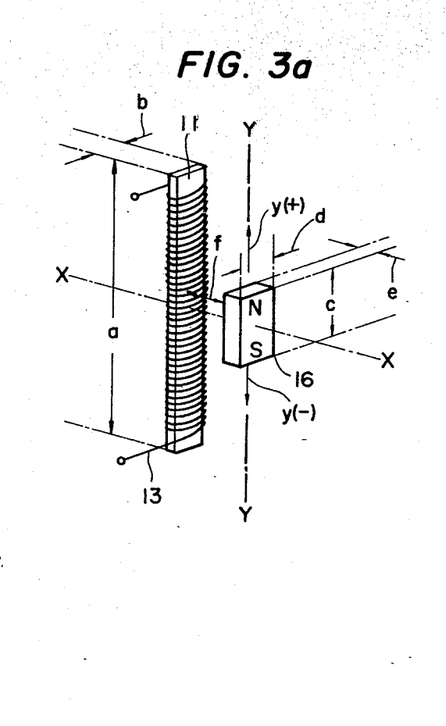
FIG. 3a is a perspective view illustrating the relative positions of a magnetically soft member and a permanent magnet, which arrangement is used in determining a time lag which varies in accordance with the relative locations of the permanent magnet to the magnetically soft member.
Figure 4:
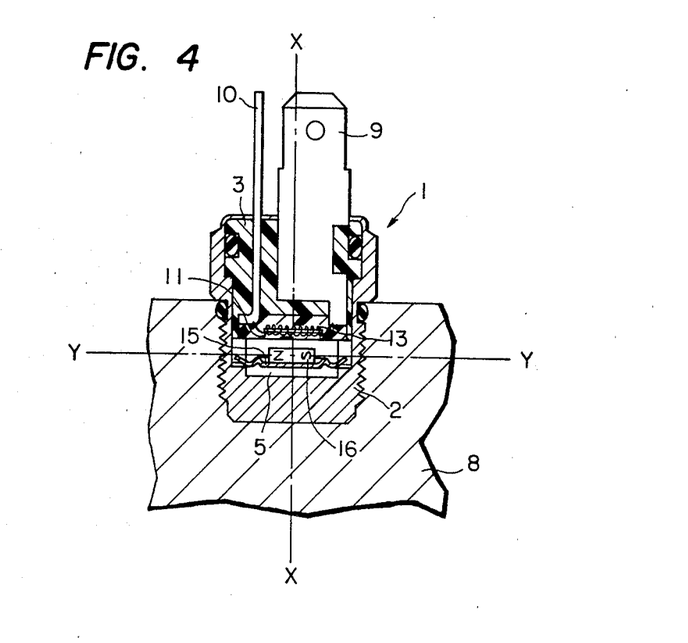
FIG. 4 is a longitudinal sectional view of a vibration sensor according to another embodiment of the invention.

As discussed above, the vibration sensor 1 of FIG. 1 may be connected to an electrical processing circuit 100 (FIG. 2a) to provide an electrical signal indicative of the location of the permanent magnet 16 within the vibration sensor 1. Initially, the vibration applied to the vibration sensor 1 is translated into the location of the permanent magnet 16. The conversion of the location of the permanent magnet 16 into an electrical signal will now be described with reference to experimental data shown in FIGS. 3b to 3d. In these experiments, the magnetically soft member 11 is fixedly mounted as shown in FIG. 3a, and the permanent magnet 16 is placed in a parallel relationship therewith. An X—X axis is chosen so as to pass through the center of the magnetically soft member 11 in a direction perpendicular to the length thereof, which represents a Y—Y axis. The point on the permanent magnet 16 which is located on the X—X axis is chosen at the origin. Then, the values of Vx and td are determined as a function of the travel Y of the permanent magnet 16 in the Y—Y direction. The specific values of various parameters, and the material of the magnetically soft member 11, as well as data obtained, are indicated in the Table 1 below as listed in Cases No. 1 to 3.

magnet disposed in alignment with the Y—Y axis which is perpendicular to the direction of the X—X axis in which the leaf spring 15 moves, and a magnetically soft member 11 is disposed in a parallel relationship with the axis of the magnet 16.

Figure 5A:
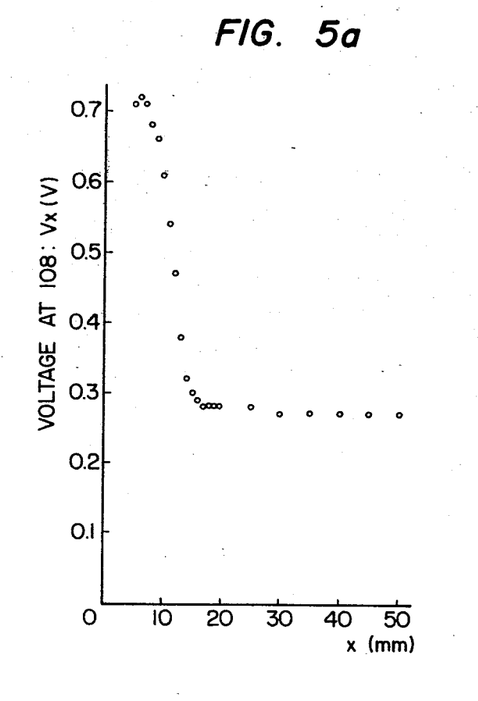
Figure 5B:
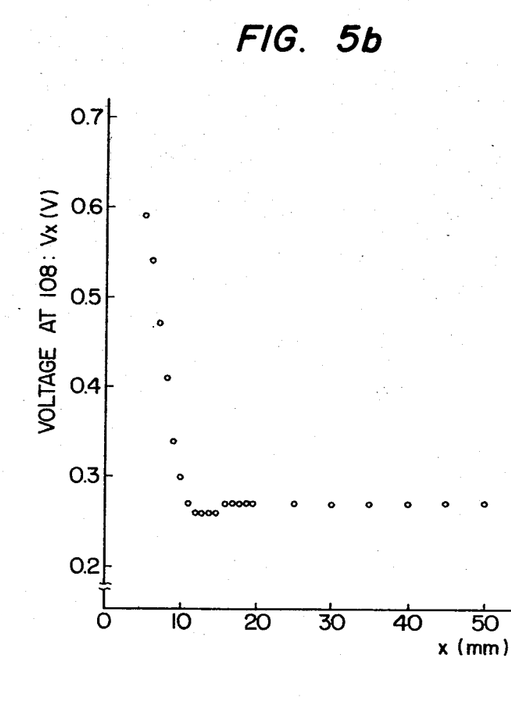

In this vibration sensor, the permanent magnet 16 moves in the direction of the X—X axis shown in FIG. 3a relative to the magnetically soft member 11 as the leaf spring 15 moves. Experimental data obtained by movement of the permanent magnet 16 in this manner is illustrated in FIGS. 5a and 5b. Various parameters such as the configuration, the size and the disposition of the associated parts utilized to obtain the data illustrated in FIGS. 5a and 5b are indicated by Cases No. 4 and 5 in Table 1. It will be seen from the data illustrated in

TABLE 1

Figure 3B:
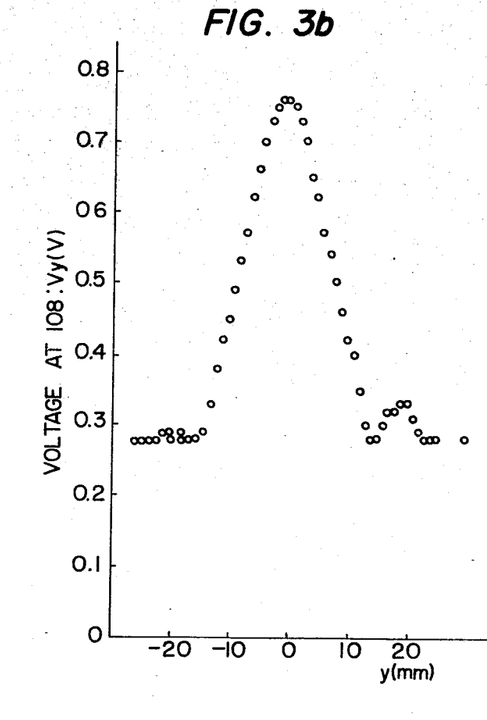
FIG. 3b graphically illustrates voltage data indicative of the time lag which varies in accordance with the travel y of a 10 mm long permanent magnet in the Y—Y direction utilizing the arrangement illustrated in FIG. 3a and when the electrical coil is connected to the electrical processing circuit shown in FIG. 2a, the pulse voltage applied to the electrical coil being such that an S-pole is produced at the upper end of the magnetically soft member as viwed in FIG. 3A.
Figure 3C:
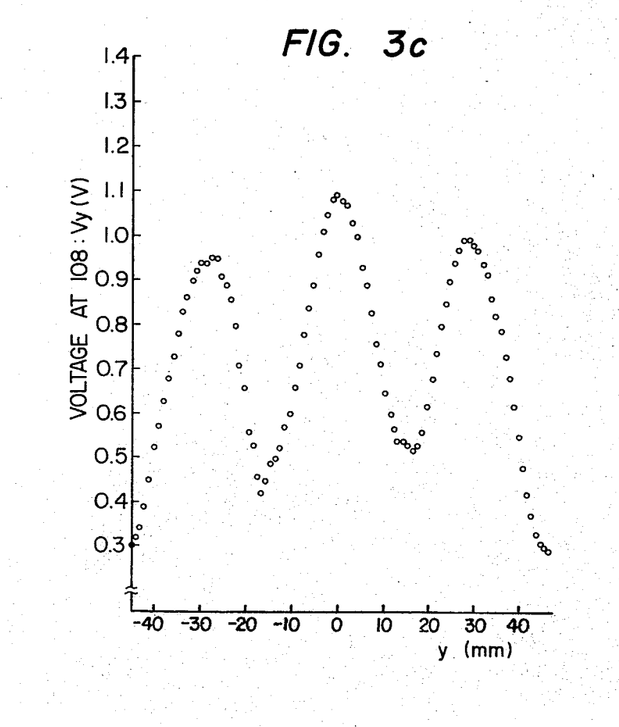
FIG. 3c graphically illustrates corresponding data for a 30 mm long permanent magnet.
Figure 3D:
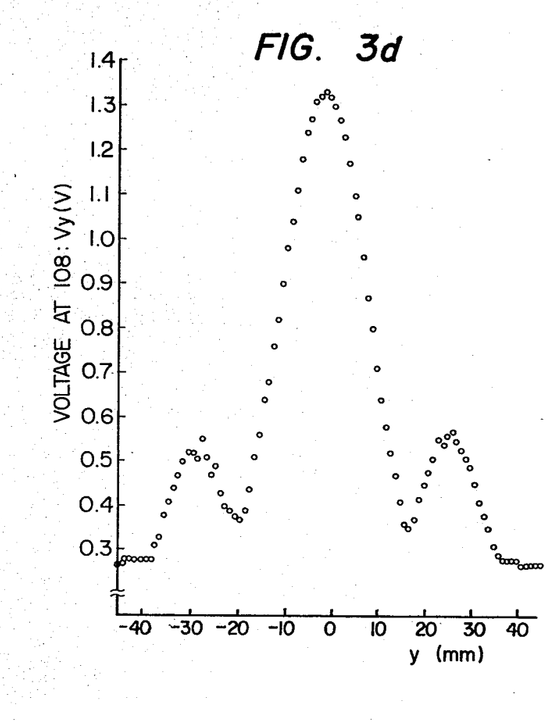

| Case No. | Material Atomic weight percent | Magnetically soft member 11 Thickness mm | a mm | b mm | Number of sheets | Electrical coil 13 Number of turns | Permanent magnet 16 c mm | d mm | Spacing e mm | f mm | Measuring means and frequency of input pulse | Voltage Polarity | Data |
|---|---|---|---|---|---|---|---|---|---|---|---|---|---|
| 1 | Fe40Ni38Mo4B18 Amorphous | 0.050 | 40 | 1.8 | 5 | 1000 | 10 | 5 | 4 | 5 | Circuit 100 5 KHz | S—N | FIG. 3b |
| 2 | Fe40Ni38Mo4B18 Amorphous | " | " | " | " | " | 30 | " | " | " | Circuit 100 5 KHz | " | FIG. 3c |
| 3 | Fe40Ni38Mo4B18 Amorphous | " | " | " | " | " | 30 | " | " | " | Circuit 100 5 KHz | N—N | FIG. 3d |
| 4 | Fe40Ni38Mo4B18 Amorphous | " | " | " | " | " | 10 | " | " | x | Circuit 100 5 KHz | S—N | FIG. 5a |
| 5 | Fe40Ni38Mo4B18 Amorphous | " | " | " | " | " | 10 | " | " | x | Circuit 100 5 KHz | N—N | FIG. 5b |
| 10 | Fe40Ni40P14B6 | 0.058 | 40 | 1.8 | 5 | 1000 | 30 | 5 | 4 | x | Circuit 100 5 KHz | S—N | FIG. 15 A1 |
| 11 | Fe40Ni40P14B6 | " | " | " | " | " | " | " | " | x | Circuit 100 5 KHz | N—N | FIG. 15 A2 |
| 12 | Ni80Fe16Mo4 Mu-Metal | 0.200 | 40 | 5 | 2 | 1000 | 30 | 5 | 4 | x | Circuit 100 5 KHz | S—N | FIG. 15 B1 |
| 13 | Ni80Fe16Mo4 Mu-Metal | " | " | " | " | " | " | " | " | x | Circuit 100 5 KHz | N—N | FIG. 15 B2 |
| 14 | Ni80Fe20 Superpermalloy | 0.100 | 40 | 5 | 2 | 1000 | " | " | " | x | Circuit 100 5 KHz | S—N | FIG. 15 C1 |
| 15 | Ni80Fe20 Superpermalloy | " | " | " | " | " | " | " | " | x | Circuit 100 5 KHz | N—N | FIG. 15 C2 |

The indication "S-N" under the column of voltage polarity means that the connection of an electrical coil 13 with the electrical circuit 100 is such that an S-pole is produced at the upper end of the magnetically soft member 11 in FIG. 3a. Similarly, the indication "N—N" means that the electrical coil 13 is connected to the electrical circuit 100 in a manner such that an N-pole is produced at the upper end of the magnetically soft member 11 in FIG. 3a.

In Case No. 1, it is seen from data shown in FIG. 3b that a voltage Vy of a very high accuracy can be obtained for the travel y of the magnet from 0 mm to +14 mm or from −1 mm to −15 mm, or preferably from +2 mm to +12 mm or from −3 mm to −13 mm in the Y—Y axis direction. It is also seen that in Case No. 3, a voltage Vy of a high accuracy is obtained for the travel y of the magnet over an increased range. In Case No. 2, the range having good linearity is relatively limited in extent, but the voltage is distributed in various areas of y. Hence, an operating range for the magnet 16 is chosen in the vibration sensor 1 of FIG. 1 so that the voltage Vy exhibits good linearity with respect to the travel or location y of the magnet.

In the vibration sensor 1 shown in FIG. 4, a permanent magnet 16 is fixedly mounted on a leaf spring 15 functioning as a magnet holder with the axis of the FIGS. 5a and 5b that when the permanent magnet 16 is driven for movement in the direction of the X—X direction, the range of the voltage Vx or time lag td as a function of the travel x of the magnet 16 which has good linearity is relatively limited. However, since the magnitude of change is great in such a limited range, a design can be made so that the permanent magnet 16 moves through such limited range.

Figure 6:
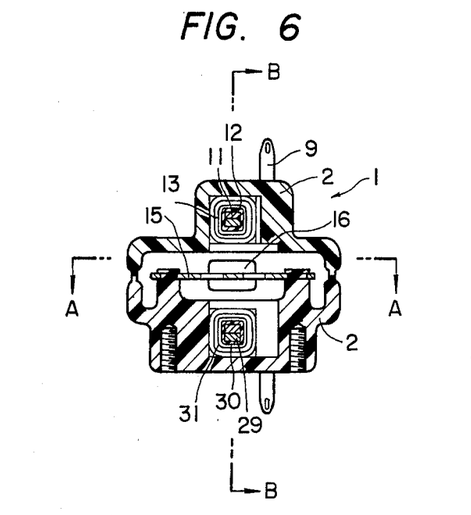
FIG. 6 is a longitudinal sectional view of a vibration sensor according to a further embodiment of the invention.
Figure 7:
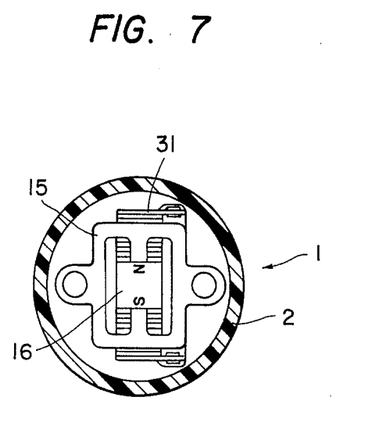
FIG. 7 is a sectional view along the line A—A in FIG. 6.
Figure 8:
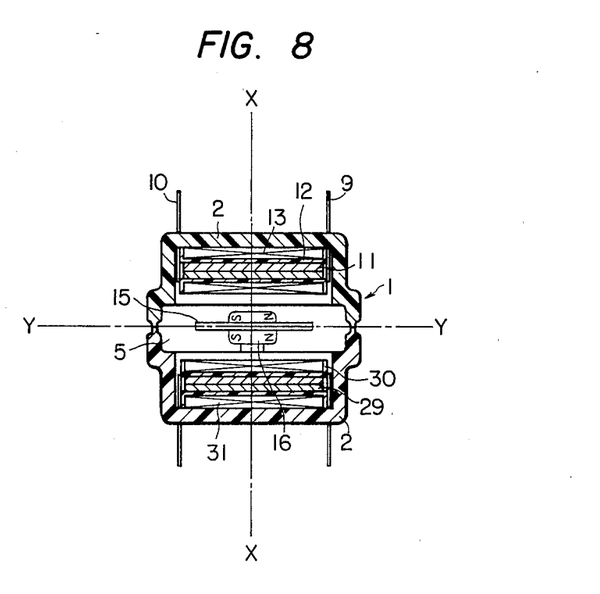
FIG. 8 is a sectional view along the line B—B in FIG. 6.

In the vibration sensor 1 shown in FIGS. 6, 7 and 8, a permanent magnet 16 is caused to move in the direction of the X—X axis in accordance with the vibration so as to move close to or away from a magnetically soft member 11, generally in the same manner as the vibration sensor shown in FIG. 4. However, it will be noted that a separate magnetically soft member 29 is disposed in opposing relationship with the first member 11 with the permanent magnet 16 interposed therebetween. The magnetically soft member 29 extends through a bobbin 30 which carries an electrical coil 31 thereon.

Figure 9:
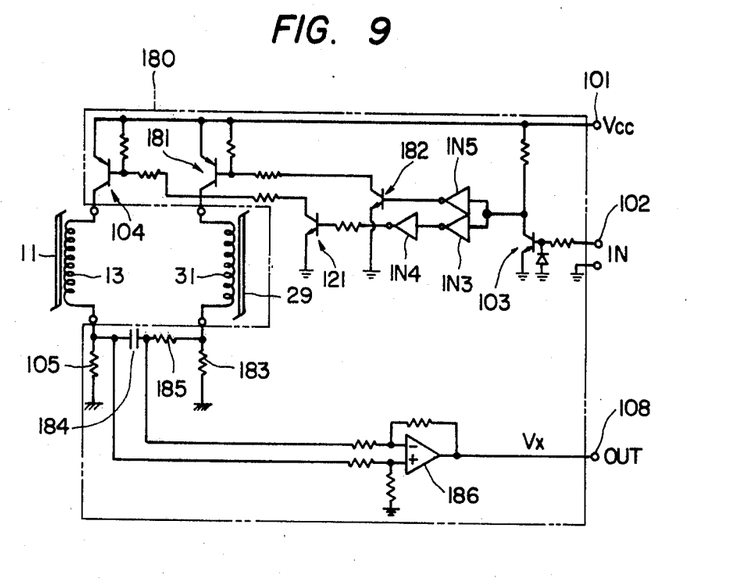
FIG. 9 is a circuit diagram of an electrical processing circuit connected to the vibration sensor shown in FIGS. 6, 7 and 8 for producing an analog voltage of a level which depends on the vibrational amplitude detected.

FIG. 9 shows an electrical processing circuit 180 which produces an analog voltage Vx in accordance with the location of the permanent magnet 16 in the vibration sensor 1 shown in FIGS. 6, 7 and 8. Specifically referring to the circuit 180, an NPN transistor 103 is turned on during the time an input voltage pulse (IN)

remains at its positive level, and is turned off during the time the input voltage pulse assumes a ground level. The collector voltage of the transistor 103 is amplified and shaped by a pair of inverting amplifiers IN3 and IN4 before it is applied to the base of an NPN transistor 121. Thus, when the input voltage pulse (IN) assumes its positive level, the transistor 103 is turned on while the transistor 121 is turned off. Consequently, a PNP transistor 104 is turned off during such time interval. While the transistor 103 is off, the transistor 121 is on and the transistor 104 is on during the time the input voltage pulse assumes the ground level. In other words, a pulse voltage is applied to the electrical coil 13, whereby a voltage pulse appears across a resistor 105 with a time lag td1 from the falling end of the input voltage pulse (IN) in a manner corresponding to the distance $x_1$ of the permanent magnet 16 from the magnetically soft member 11.

A constant voltage is applied to another electrical coil 31 through a PNP transistor 181. Since the transistor 103 is turned on to cause an inverting amplifier IN5 to produce a positive output which in turn turns an NPN transistor 182 on during the time the input voltage pulse (IN) assumes its positive level, the transistor 181 is also turned on, while the latter is turned off when the input voltage pulse (IN) assumes a ground level. As a result, a constant voltage is applied to the second electrical coil 31 when no voltage is applied to the first electrical coil 13 while no voltage is applied to the second electrical coil 31 when a voltage is applied to the coil 13. Stated differently, the constant voltage is applied to the first and the second coils 13, 31 in an alternate fashion in accordance with the input voltage pulse (IN).

The second coil 31 is connected to a resistor 183, across which a voltage pulse appears having a rising end which lags behind the rising end of the input voltage pulse (IN) by a time interval of td2 which depends on the distance $x_2$ of the permanent magnet 16 from the magnetically soft member 11. The voltage Vx1 developed across the resistor 105 is applied to one plate of a capacitor 184, while the voltage Vx2 developed across the resistor 183 is applied to the other plate of the capacitor 184. Since the distance between the permanent magnet 16 on one hand and the first and the second magnetically soft members 11, 29 on the other hand is represented by $x_1$ and $x_2$, respectively, with $x_1 + x_2 = k$ (constant), and since Vx1 and Vx2 are proportional to the magnitude of $x_1$ and $x_2$, respectively, the potential difference across the capacitor 184 corresponds to the magnitude of $(x_1 - x_2)$.

The capacitor 184 forms an integrator together with a resistor 185, thus producing a voltage thereacross which corresponds to the magnitude of $(x_1 - x_2)$. Since $x_2 = k - x_1$, $x_1 - x_2 = 2x_1 + k$. Thus, the voltage across the capacitor 184 corresponds to the magnitude of $2x_1$. That is, an analog voltage is obtained which corresponds to twice the travel $x_1$ of the permanent magnet 16 as referenced to the first magnetically soft member 11. The opposite ends of the capacitor 184 are connected to both inputs of an operational amplifier 186 which is designed as a differential amplifier. The amplifier 186 produces an analog output Vx which corresponds to $2x_1$.

Figure 10A:
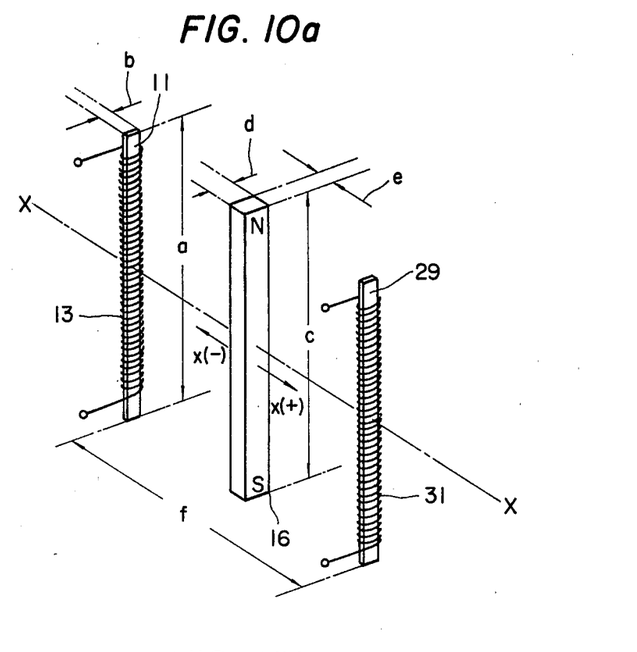
FIG. 10a is a perspective view illustrating the relative positions of a pair of magnetically soft members and a permanent magnet, which arrangement is used to determine a time lag of associated electrical coils in accordance with the position of the permanent magnet relative to the members.

The value of Vx is determined as a function of the travel x of the permanent magnet 16 in the direction of the X—X axis using an arrangement as illustrated in FIG. 10a where the magnetically soft members 11 and 29 are fixedly disposed in parallel relationship with each other with the permanent magnet 14 placed intermediate them so as to be parallel to both members 11 and 29. An axis passing through the magnet and the members 11, 29 in a direction perpendicular to their axes is chosen as the X—X axis with the origin (x=0) chosen at the location of the magnet 16 when it is positioned midway between the members 11, 29. Parameters a to f including the configuration and the disposition as well as the material of the magnetically soft members 11 and 29 are indicated in the Table 2 below in correspondence to the associated measured data.

TABLE 2

Figure 10B:
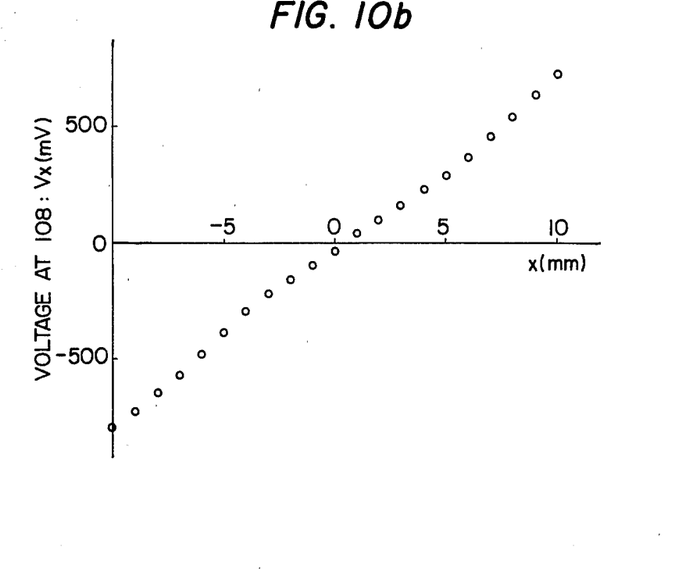
Figure 10C:
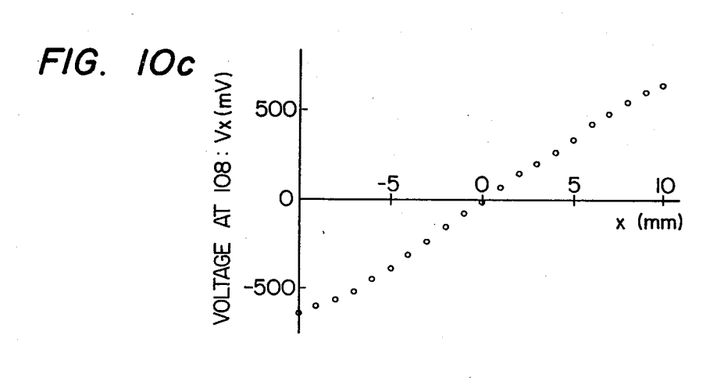
Figure 10D:
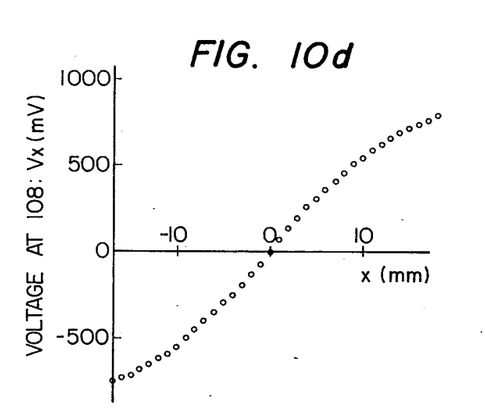
FIG. 10d graphically presents data corresponding to FIG. 10b when the electrical coils are spaced apart by a distance of 50 mm.
Figure 10E:
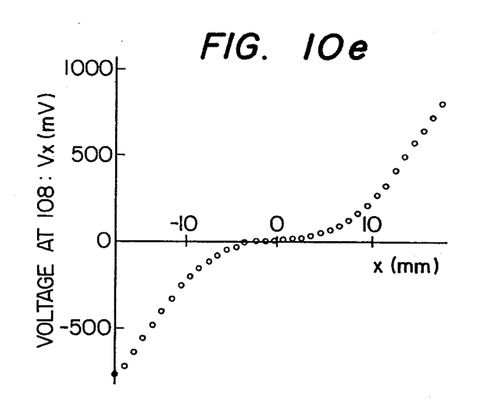
FIG. 10e graphically illustrates data corresponding to FIG. 10c when the electrical coils are spaced apart by a distance of 50 mm.

| Case No. | Magnetically soft member 11, 29 | | | | Electrical Coil 13, 31 | Permanent magnet 16 | | | Spacing | Measuring means and frequency of input pulse | Voltage polarity | Data |
|---|---|---|---|---|---|---|---|---|---|---|---|---|
| | Material Atomic weight percent | Thickness | a mm | b mm | Number of sheets | Number of turns | c mm | d mm | e mm | f mm | | | |
| 6 | Fe Ni Mo B Amorphous | 0.05 | 30 | 1.8 | 4 | 1000 | 30 | 5 | 4 | 35 | Circuit 180 5 KHz | S—N | FIG. 10b |
| 7 | Fe Ni Mo B Amorphous | " | " | " | " | " | " | " | " | 35 | Circuit 180 5 KHz | N—N | FIG. 10c |
| 8 | Fe Ni Mo B Amorphous | " | " | " | " | " | " | " | " | 50 | Circuit 180 5 KHz | S—N | FIG. 10d |
| 9 | Fe Ni Mo B Amorphous | " | " | " | " | " | " | " | " | 50 | Circuit 180 5 KHz | N—N | FIG. 10e |

When the distance between the magnetically soft members 11 and 29 is small, a Vx−x response having good linearity with respect to the distance is obtained in a range of $-10$ mm $< x < 10$ mm, as indicated in FIGS. 10b and 10c. For an increased distance f between the members 18 and 29, relatively good linearity is achieved in a range of $-9$ mm $< x < 9$ mm in an S-N mode as illustrated in FIG. 10d, but the extent over which the good linearity is achieved is narrower than that obtained with a reduced value of f. Also, the linearity is degraded as compared with that obtained with a smaller value of f. As shown in FIG. 10e, the linearity is very poor in a region adjacent to the origin (x=0) in an N—N mode while the linearity is improved when one of the magnetically soft members is approached, the linearity becoming very close to that of Cases No. 4 and 5. This is because the magnetic field which the permanent magnet 16 exerts upon the magnetically soft members 11 and 29 is reduced when the magnet is located adjacent to the origin. Thus, since the Vx−x response depends not only on the distance f between the magnetically soft members 11 and 29 but also on the configuration of the permanent magnet 16 and the field strength produced thereby, a desired response can be obtained in a relatively simple manner.

Figure 11:
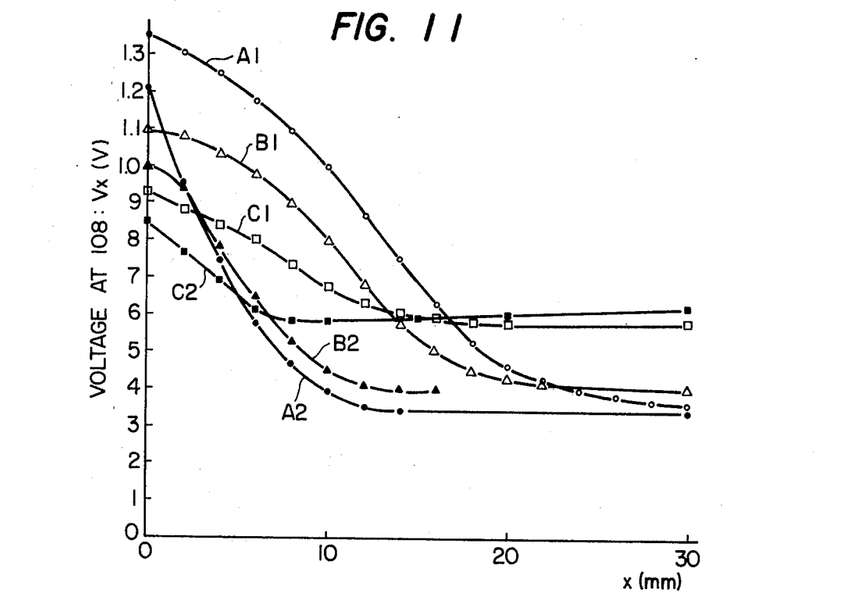
FIG. 11 graphically illustrates the relationship between the voltage data, indicative of the time lag derived from the electrical processing circuit shown in FIG. 2a, and the displacement x of the permanent magnet in the X—X direction in the array shown in FIG. 3a of various magnetically soft members.

In the described embodiments and modifications, each of the magnetically soft members 11 and 29 comprises a plurality of sheets of an amorphous magnetic material which exhibits a high resilience and a high resistance to deformation. However, other magnetic materials may be used for the magnetically soft members 11 and 29 in carrying out the invention. FIG. 11 graphically illustrates the Vx−x data, representing a comparison between the use of an amorphous magnetic material and other magnetic materials. To obtain this data, the magnetically soft member and the permanent magnet are arranged as shown in FIG. 3a and the permanent magnet is driven in the direction of the X—X axis. Various parameters such as the configuration and the disposition of the parts are indicated in the Table 1 as Cases No. 10–15. Curves A1–C2 of FIG. 11 demonstrate that either magnetically soft member exhibits a high linearity in the Vx−x response over a range of at least 6 mm (for example, from x=10 mm to x=16 mm for curve A, and from x=8 mm to x=14 mm for curve B1), and hence can be used in the vibration sensor of the invention. A magnetically soft member formed of an amorphous material is preferably used for applications which require a high resistance to oscillations and to deformation.

It will be apparent from the above description of several embodiments and demonstration of experimental data that the vibration sensor of the present invention output a higher electrical signal corresponding to the vibration in comparison with the vibration sensor using a strain gauge since the sensor of this invention detects the change in the strength of a magnetic field from a permanent magnet by the combination of a damping means and a magnetically soft member. Furthermore, the vibration sensor of the present invention converts displacement of a movable member which responds to the application of the vibration into a time lag td between an input pulse to an electrical coil and a current pulse through the coil. The time lag td is processed in an analog form. In this manner, a vibration detection signal is obtained through electrical processing, so that it is highly immune from the influence of oscillations and is less susceptible to degradation such as may be caused by mechanical abrasion. Since there is no connection mechanism between the movable body and its associated transducer, there is produced no rattling, thus achieving a vibration detection in a stabilized manner. What is more important, the arrangement of the electrical processing circuit connected to the sensor is simple.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A vibration sensor comprising:
   a casing;
   a permanent magnet defining a magnetization direction and movably disposed in said casing;
   spring means mounted in said casing for supporting said movable permanent magnet;
   a thin plate core of magnetically soft material defining a longitudinal axis and disposed within said casing adjacent to the vicinity of a course of movement of said movable permanent magnet;
   an electrical coil disposed around said magnetically soft material core, whereby said permanent magnet and magnetically soft material core are disposed in said casing such that the magnetization direction of said magnet is parallel to the longitudinal axis of said core;
   means for detecting vibrations based on correspondingly produced movement of said magnet, comprising;
   means for applying a pulse voltage to said coil to saturate magnetically said core: and
   means coupled to said coil for producing a vibration output signal indicative of the movement of said magnet and therefore of said vibrations based on the time between application of said pulse voltage and saturation of said core.

2. A vibration sensor according to claim 1 wherein the direction of movement of said permanent magnet is same as the magnetization direction thereof.

3. A vibration sensor according to claim 1, wherein the direction of movement of said permanent magnet is perpendicular to the magnetization direction thereof.

* * * * *

UNITED STATES PATENT AND TRADEMARK OFFICE
CERTIFICATE OF CORRECTION

PATENT NO. : 4,361,045

DATED : November 30, 1982

INVENTOR(S) : Shinichiro Iwasaki

It is certified that error appears in the above-identified patent and that said Letters Patent is hereby corrected as shown below:

Column 1, line 51, "(N/E)" should read -- N/E --.

Column 2, line 28, "view" should read -- views --.

Column 2, line 53, "viwed" should read -- viewed --.

Signed and Sealed this

Twenty-fourth Day of May 1983

[SEAL]

Attest:

DONALD J. QUIGG

Attesting Officer     Acting Commissioner of Patents and Trademarks

UNITED STATES PATENT AND TRADEMARK OFFICE
CERTIFICATE OF CORRECTION

PATENT NO. : 4,361,045

DATED : November 30, 1982

INVENTOR(S) : Shinichiro Iwasaki

It is certified that error appears in the above-identified patent and that said Letters Patent is hereby corrected as shown below:

Col. 2, line 53, delete "viwed" and substitute --viewed--.

Col. 2, line 53, delete "FIG 3A" and substitute --FIG. 3a--.

Col 3, line 2, before "FIG. 2a" insert --in--.

Col. 3, line 63, delete "an" and substitute --and--.

Col. 5, Table 1, "e mm" (and everything under it) which is presently under the heading "Spacing" should be moved under the heading "Permanent magnet 16".

Col. 7, 8, Table 2, under the heading "Material Atomic weight percent" in each case (6, 7, 8, 9) delete "Fe Ni Mo B" and substitute --Fe$_{40}$ Ni$_{40}$ Mo$_2$ B$_{18}$--.

Signed and Sealed this

Eleventh Day of October 1983

[SEAL]

Attest:

Attesting Officer

GERALD J. MOSSINGHOFF

Commissioner of Patents and Trademarks